(12) United States Patent
Cavalieri et al.

(10) Patent No.: US 9,873,783 B2
(45) Date of Patent: Jan. 23, 2018

(54) ETHYLENE POLYMER COMPOSITION HAVING IMPROVED TENSILE PROPERTIES

(71) Applicant: BASELL POLYOLEFINE GMBH, Wesseling (DE)

(72) Inventors: Claudio Cavalieri, Ferrara (IT); Michele Grazzi, Ferrara (IT); Roberto Pantaleoni, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/320,584

(22) PCT Filed: Jun. 17, 2015

(86) PCT No.: PCT/EP2015/063625
§ 371 (c)(1),
(2) Date: Dec. 20, 2016

(87) PCT Pub. No.: WO2015/197454
PCT Pub. Date: Dec. 30, 2015

(65) Prior Publication Data
US 2017/0183486 A1    Jun. 29, 2017

(30) Foreign Application Priority Data
Jun. 25, 2014  (EP) ..................... 14173890

(51) Int. Cl.
*C08L 23/06* (2006.01)
*C08L 23/08* (2006.01)
*C08L 23/16* (2006.01)
*C08F 2/00* (2006.01)

(52) U.S. Cl.
CPC .............. *C08L 23/06* (2013.01); *C08F 2/001* (2013.01); *C08L 23/0815* (2013.01); *C08L 23/16* (2013.01); *C08L 2203/202* (2013.01)

(58) Field of Classification Search
CPC ...... C08L 23/06; C08L 23/0815; C08L 23/16; C08L 2203/202; C08F 2/001
See application file for complete search history.

(56) References Cited

U.S. PATENT DOCUMENTS

| | | | |
|---|---|---|---|
| 8,129,472 B2* | 3/2012 | Turner et al. | C08L 23/04 525/191 |
| 2006/0241256 A1* | 10/2006 | Baann et al. | C08L 23/0815 526/170 |
| 2010/0152383 A1 | 6/2010 | Jiang et al. | |
| 2011/0136983 A1* | 6/2011 | Kapur et al. | B29C 49/0005 525/240 |
| 2013/0029125 A1 | 1/2013 | Tse et al. | |
| 2013/0209774 A1 | 8/2013 | Shirodkar et al. | |

OTHER PUBLICATIONS

International Search Report and Written Opinion dated Aug. 17, 2015 (Aug. 17, 2015) for Corresponding PCT/EP2015/063625.

* cited by examiner

*Primary Examiner* — Nathan M Nutter

(57) ABSTRACT

The present disclosure relates to an ethylene polymer composition having an eta (0.01) equal to or higher than 35,000 Pa·s, comprising:
A) 25-75% by weight of an ethylene polymer selected from ethylene homopolymers, copolymers of ethylene with 10% or less of one or more olefin comonomers, and mixtures of the homopolymers and copolymers;
B) 25-75% by weight of a copolymer of ethylene and propylene comprising 45-70% by weight of ethylene;
wherein eta (0.01) is the complex shear viscosity at an angular frequency of 0.01 rad/s, measured with dynamic oscillatory shear in a plate-plate rotational rheometer at a temperature of 200° C., and the amounts of A) and B) refer to the total weight of A)+B).

10 Claims, No Drawings

ETHYLENE POLYMER COMPOSITION HAVING IMPROVED TENSILE PROPERTIES

FIELD OF THE INVENTION

The present disclosure relates to an ethylene polymer composition and to its use in applications where high tensile properties are required.

BACKGROUND OF THE INVENTION

The mechanical properties of ethylene polymers, such as high density polyethylene (HDPE), can be improved in some embodiments by the addition of ethylene/propylene highly amorphous copolymers (EPR).

For many uses of the resulting compositions, e.g. cable coatings and plastic car parts, including car panels, fillers and other additives, such as flame retardant additives, may be used.

In certain applications, these compositions may require enhanced tensile properties, such as when large amounts of fillers/additives are present, to avoid excessive deformation, thinning and failure under tensile stresses.

It has now been found that enhanced tensile properties may be achieved by enhancing the complex shear viscosity value of specific blends of ethylene polymers.

The ethylene polymer compositions of the present disclosure exhibit a favorable balance of tensile strength at break, elongation at break and compression set, while still maintaining good thermoplastic properties.

SUMMARY OF THE INVENTION

Thus the present invention provides an ethylene polymer composition having an eta ($\eta$; defined as the complex shear viscosity at an angular frequency of 0.01 rad/s) equal to or higher than 35,000 Poise (Pa·s), such as equal to or higher than 40,000 Pa·s, and equal to or higher than 50,000 Pa·s, and comprising (percentages by weight):

A) 25-75%, including 30-70%, of an ethylene polymer selected from ($A_1$) ethylene homopolymers, and ($A_2$) copolymers of ethylene with one or more olefin comonomers, wherein the comonomer content is 10% or less, including from 1 to 9% with respect to the weight of the copolymer, and mixtures of homopolymers ($A_1$) and copolymers ($A_2$);

B) 25-75%, such as 30-70%, of a copolymer of ethylene and propylene containing from 45% to 70%, for instance from 50% to 70%, of ethylene;

wherein eta (0.01) is the complex shear viscosity at an angular frequency of 0.01 rad/s, measured with dynamic oscillatory shear in a plate-plate rotational rheometer at a temperature of 200° C., and the amounts of A) and B) refer to the total weight of A)+B).

DETAILED DESCRIPTION OF THE INVENTION

In general, the term "copolymer" includes polymers containing more than one kind of comonomer, such as terpolymers.

The upper limit of eta (0.01) for the ethylene polymer composition of the disclosure is, in some embodiments, about 150,000 Pa·s.

The upper limit of eta applies to all of the lower limits described in the disclosure.

The above defined copolymers ($A_2$) may be copolymers of ethylene with one or more comonomers selected from olefins having the general formula $CH_2=CHR$, wherein R is an alkyl radical that may be linear or branched having from 1 to 10 carbon atoms.

Specific examples of olefins for use in the present disclosure are propylene, butene-1, pentene-1, 4-methylpentene-1, hexene-1, octene-1 and decene-1.

In some embodiments, the ethylene polymer A) has a density of from 0.920 to 0.960 $g/cm^3$, such as from 0.925 to 0.955 $g/cm^3$ and from 0.925 to 0.945 $g/cm^3$, as determined according to ISO 1183 at 23° C.

In certain embodiments, the component B) in the ethylene polymer composition of the present disclosure is an ethylene copolymer containing a relatively high amount of propylene such that component B) is less crystalline than component A).

In further embodiments, the ethylene polymer composition of the present disclosure has a melting peak at a temperature (Tm) of 120° C. or higher, such as from 120° C. to 130° C., as measured by differential scanning calorimetry (DSC) with a heating rate of 20° C. per minute.

In additional embodiments, the melt flow rate (MFR) of the ethylene polymer composition is from 0.1 to 3 g/10 min, including from 0.1 to 2 g/10 min, as determined according to ISO 1133 at 230° C. with a load of 2.16 kg.

In some embodiments, the value of eta (100), which is the complex shear viscosity at an angular frequency of 100 rad/s, measured with dynamic oscillatory shear in a plate-plate rotational rheometer at a temperature of 200° C., is from 1,200 to 2,500 Pa·s.

In certain embodiments, the flexural modulus value for the ethylene polymer composition of the present disclosure is from 70 to 250 MPa.

In further embodiments, the total ethylene content in the ethylene polymer composition of the present disclosure, as determined based on the total amount of A)+B), is 65%-88% by weight, including 70-85% by weight.

In one embodiment of the present disclosure, the disclosed ethylene polymer composition is obtained by reacting:

I) a precursor ethylene polymer composition comprising components A) and B) as defined above in the above referenced proportions, comprising an eta (0.01) value of lower than 35,000 Pa·s, such as from 5,000 to 34,000 Pa·s; and II) a radical initiator.

The precursor ethylene polymer composition can, for certain embodiments of the present disclosure, be prepared by melt blending the components A) and B) using commonly known techniques, for example melt extrusion, but can also be prepared in the form of a reactor blend with a multi-stage polymerization process.

In some embodiments, there is no need to separately react each one of components A) and B) with the radical initiator.

In additional embodiments, the ethylene polymer composition of the present disclosure can be obtained by a process comprising:

i) preparing the precursor ethylene polymer composition by polymerizing the monomers in at least two sequential steps, wherein components A) and B) are prepared in sequential steps, operating in each step in the presence of the polymer formed and the catalyst used in the preceding step; and ii) subjecting the precursor composition obtained in i) to a reaction with a radical initiator.

In some embodiments, the the comonomer content and relative amounts of components A) and B) are the same for the precursor composition and the final composition (following the reaction with the radical initiator). The reaction with the radical initiator may increase the eta (0.01) value of the composition.

In certain embodiments, the precursor ethylene polymer composition comprises a component A) containing 10% or less, such as 8% or less, and 6% or less, with respect to the weight of A), of a fraction $XS_A$ soluble in xylene at 25° C., and/or a component B) containing 60% or more, including 65% or more, with respect to the weight of B), of a fraction $XS_B$ soluble in xylene at 25° C.

In further embodiments, the upper limit of $XS_B$ content in component B) of the precursor ethylene polymer composition is 90% by weight.

The above referenced upper limit applies to all of the lower limits specified above.

In some embodiments, the intrinsic viscosity [η] of the $XS_B$ fraction in the precursor ethylene polymer composition is 2 dl/g or more, such as from 2 to 3.5 dl/g.

Moreover, in certain embodiments the precursor ethylene polymer composition can have at least one of the following additional features:

a eta (100) value from 1,200 to 2,500 Pa·s;

an MFR value, determined according to ISO 1133 at 230° C. with a load of 2.16 kg, of 0.3 to 5 g/10 min, including from 0.5 to 3 g/10 min;

a ethylene polymer A) density of from 0.920 to 0.960 g/cm³, such as from 0.925 to 0.955 g/cm³, and from 0.925 to 0.945 g/cm³, as determined according to ISO 1183 at 23° C.;

a melting peak at a temperature Tm of 120° C. or higher, such as from 120° C. to 130° C., as measured by differential scanning calorimetry (DSC) with a heating rate of 20° C. per minute;

an MFR value for ethylene polymer A), as determined according to ISO 1133 at 230° C. with a load of 2.16 kg, from 1 to 15 g/10 min;

an amount of total fraction $XS_{TOT}$ soluble in xylene at 25° C., as determined by extraction carried out on the total amount of A)+B), of 25-60% by weight, including 30-55% by weight;

an intrinsic viscosity [η] of the $XS_{TOT}$ fraction of 1.8 dl/g or more, such as from 1.8 to 3.2 dl/g; and a fusion enthalpy $\Delta H_{fus}$, measured by differential scanning calorimetry (DSC) with a heating rate of 20° C. per minute, of 60 J/g or more, such as from 60 to 95 J/g.

All the disclosed [η] values are measured in tetrahydronaphthalene at 135° C.

While no limitation is known to exist for the polymerization process and catalysts to be used for preparing the precursor polyethylene composition of the present disclosure, it has been found that the composition can be prepared by a sequential polymerization, comprising at least two sequential steps, wherein components A) and B) are prepared in separate subsequent steps, operating in each step with the exception of the first step, in the presence of the polymer formed and the catalyst used in the preceding step. The catalyst is added only in the first step; however, its activity is such that it is still active for all the subsequent steps.

The polymerization, which can be a continuous or a batch process, may be carried out following known techniques and operating in liquid phase, optionally in the presence of an inert diluent, or in gas phase, or by mixed liquid-gas techniques.

In some embodiments, the reaction time, pressure and temperature for the polymerization steps are not critical. In further embodiments, the temperature is from 50 to 100° C., and the pressure can be atmospheric or higher.

The regulation of the molecular weight is carried out by using known regulators such as hydrogen.

In some embodiments, the polymerizations of the present disclosure are carried out in the presence of a Ziegler-Natta catalyst. A Ziegler-Natta catalyst comprises the product of the reaction of an organometallic compound of group 1, 2 or 13 of the Periodic Table of elements with a transition metal compound of Groups 4-10 of the Periodic Table of Elements (new notation). In certain embodiments, the transition metal compound can be selected from Ti, V, Zr, Cr and Hf and may be supported on $MgCl_2$.

In additional embodiments, catalysts comprise the product of the reaction of an organometallic compound of Groups 1, 2 or 13 of the Periodic Table of Elements with a solid catalyst component comprising a Ti compound and an electron donor compound supported on $MgCl_2$.

In some embodiments, the organometallic compounds comprise aluminum alkyl compounds.

In one embodiment, the precursor ethylene polymer composition of the present disclosure is obtainable by using a Ziegler-Natta polymerization catalyst, such as a Ziegler-Natta catalyst supported on $MgCl_2$ and a Ziegler-Natta catalyst comprising the product of reaction of:

1) a solid catalyst component comprising a Ti compound and an electron donor (internal electron-donor) supported on $MgCl_2$;

2) an aluminum alkyl compound (cocatalyst); and, optionally, 3) an electron-donor compound (external electron-donor).

In certain embodiments, the solid catalyst component (1) comprises an electron-donor compound selected from ethers, ketones, lactones, compounds containing N, P and/or S atoms, and mono- and dicarboxylic acid esters.

Additional electron-donor compounds for use in the present disclosure include phthalic acid esters such as diisobutyl phthalate and succinic acid esters.

Succinic acid esters for use in the present disclosure may be represented by the following formula (I):

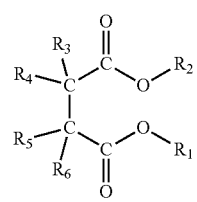

(I)

wherein the radicals $R_1$ and $R_2$, equal to or different from each other, are $C_1$-$C_{20}$ linear or branched alkyl, alkenyl, cycloalkyl, aryl, arylalkyl or alkylaryl groups, optionally containing heteroatoms; the radicals $R_3$ to $R_6$, equal to or different from each other, are hydrogen or a $C_1$-$C_{20}$ linear or branched alkyl, alkenyl, cycloalkyl, aryl, arylalkyl or alkylaryl groups, optionally containing heteroatoms; and the radicals $R_3$ to $R_6$, which are joined to the same carbon atom, can be linked together to form a cyclic compound.

In some embodiments, $R_1$ and $R_2$ may be selected from $C_1$-$C_8$ alkyl, cycloalkyl, aryl, arylalkyl and alkylaryl groups. In addition, compounds in which $R_1$ and $R_2$ are selected from primary alkyls and branched primary alkyls may be used. Examples of $R_1$ and $R_2$ groups for use in the present disclosure include methyl, ethyl, n-propyl, n-butyl, isobutyl, neopentyl and 2-ethylhexyl.

One of the groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, compounds in which two non-hydrogen radicals hydrogen are linked to the same carbon atom. In further embodiments, compounds in which at least two radicals different from hydrogen are linked to different carbon atoms, that is $R_3$ and $R_5$ or $R_4$ and $R_6$, may be used.

Other electron-donors for use in the present disclosure include the 1,3-diethers in published European patent applications EP-A-361493 and 728769.

As cocatalysts (2), in some embodiments trialkyl aluminum compounds, such as Al-triethyl, Al-triisobutyl and Al-tri-n-butyl, may be used.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and silicon compounds containing at least one Si—OR bond (where R is a hydrocarbon radical).

Examples of such silicon compounds include those of the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

Useful examples of silicon compounds for use in the present technology include (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, 1,3-diethers may also be used as external donors. In cases where the internal donor is one or more 1,3-diethers, the external donor can be omitted.

In some embodiments, the catalysts disclosed herein may be precontacted with small quantities of olefin (prepolymerization), maintaining the catalyst in suspension in a hydrocarbon solvent, and polymerizing at temperatures from room temperature to 60° C., which may result in a quantity of polymer from 0.5 to 3 times the weight of the catalyst.

The operation can also take place in a liquid monomer, which may produce a quantity of polymer up to 1000 times the weight of the catalyst.

In some embodiments, the precursor ethylene polymer composition may then be reacted with a radical initiator to achieve the desired eta (0.01) value.

In certain embodiments, a radical initiator for use in the present technology may be selected from organic peroxides.

In further embodiments, the organic peroxide is a peroxydicarbonate.

The peroxydicarbonates have previously been reported to enhance the melt strength of propylene polymers, as disclosed in EP0384431 and WO9927007.

In some embodiments, peroxydicarbonates for use in the present disclosure are the compounds of the formula:

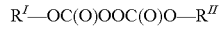

wherein $R^I$ and $R^{II}$ are independently selected from $C_1$-$C_{20}$ saturated or unsaturated hydrocarbon radicals, linear or branched, and optionally containing heteroatoms such as O and/or N.

In further embodiments, the peroxydicarbonate compound is dicetyl peroxydicarbonate, in which $R^I$ and $R^{II}$ are both hexadecyl radicals.

Other examples of peroxydicarbonate compounds for use in the present technology include dimyristyl peroxydicarbonate, diisopropyl peroxydicarbonate; di-n-butyl peroxydicarbonate; di-sec-butyl peroxydicarbonate; bis (2-ethylhexyl) peroxydicarbonate; and bis (4-tert-butylcyclohexyl) peroxydicarbonate.

In some embodiments, a reaction with a radical initiator can be carried out by any means and under the conditions known in the art to be effective for radical initiated reactions in olefin polymers.

For instance, radical initiated reactions can be run in conventional apparatuses generally used for processing polymers in a molten state, including single or twin screw extruders, and optionally under an inert atmosphere such as a nitrogen atmosphere.

The amount of radical initiator to be added to the precursor composition can be determined by one skilled in the art, based upon the eta (0.01) value of the precursor composition and the desired eta (0.01) final value. In some embodiments, the amount of radical initiator ranges from 0.1 to 1% by weight with respect to the total weight of the precursor composition and the radical initiator.

In certain embodiments, the reaction temperature is in the range of from 180 to 300° C.

The ethylene polymer composition of the present disclosure can also contain additives commonly employed in the art, such as antioxidants, light stabilizers, heat stabilizers, colorants and fillers.

The present disclosure also provides for articles such as extruded articles, which may include cable covering and plastic car parts (panels) comprising the polyolefin composition of the present disclosure.

EXAMPLES

The practice and advantages of various embodiments, compositions and methods as provided herein are disclosed below in the following examples. These examples are illustrative only and are not intended to limit the scope of the disclosure in any manner whatsoever.

The following analytical methods are used to characterize the polymer compositions.

Complex Shear Viscosity

Measured at angular frequency of 0.01 rad/s and 200° C. as follows:

Samples are melt-pressed for 4 min at 200° C. and 200 bar into plates of 1 mm thickness. Disc specimens (diameter=25 mm) are stamped and inserted in the rheometer, which is pre-heated to 200° C. The measurement can be performed using any rotational rheometer commercially available, such as the Anton Paar MCR 300 with a plate-plate geometry. A frequency-sweep is performed. After 4 min of annealing the sample at the measurement temperature of 200° C. under a constant strain-amplitude of 5%, the stress response of the material is measured and analyzed in a range of excitation frequencies (ω) from 670 to 0.02 rad/s. The standardized basic software is utilized to calculate the rheological properties, i.e. the storage-modulus, G', the loss-modulus, G", the phase lag δ (=arctan(G"/G')) and the complex viscosity, η*, as a function of the applied frequency, namely η*(ω)=[G'

$(\omega)^2+G''(\omega)^2]^{1/2}/\omega$. The value of the latter at an applied frequency ($\omega$) of 0.01 rad/s is the eta (0.01) value.

The value of the latter at an applied frequency ($\omega$) of 100 rad/s is the eta (100) value.

Propylene or Butene-1 Content Determined Via Infrared (IR) Spectroscopy

The following measurements are used to calculate the propylene content:
a) Area (ANIR) of the combination absorption bands between 4482 and 3950 cm$^{-1}$, which is used for spectrometric normalization of the measured film thickness.
b) Area (A971) of the absorption band due to propylene sequences in the range of 986-952 cm$^{-1}$, omitting the area beneath a baseline as drawn between the endpoints.

The ratio A971/ANIR is calibrated by analyzing copolymers of known compositions and determined by NMR spectroscopy.

The following measurements are used to calculate the butene-1 content:
Area (ANIR) of the combination absorption bands between 4482 and 3950 cm$^{-1}$ which is used for spectrometric normalization of the measured film thickness.
Area (Ac4) of the absorption band due to ethyl branches from 1-butene units in the range of 781-750 cm$^{-1}$, omitting the area beneath a baseline drawn between the endpoints.

The ratio Ac4/ANIR is calibrated by analyzing copolymers of known compositions and determined by NMR spectroscopy.

Density

Determined according to ISO 1183 at 23° C.

Melt Flow Rate

Measured according to ISO 1133 at 230° C. with a load of 2.16 kg, unless otherwise specified.

Melting Temperature (ISO 11357-3)

Determined by differential scanning calorimetry (DSC). A sample weighting 6±1 mg is heated to 200±1° C. at a rate of 20° C./min and kept at 200±1° C. for 2 minutes in a nitrogen stream and is thereafter cooled at a rate of 20° C./min to 40±2° C., and kept at this temperature for 2 min to crystallize the sample. The sample is then melted at a temperature rise rate of 20° C./min up to 200° C.±1. The melting scan is recorded, a thermogram is obtained, and temperatures corresponding to the recorded peaks are analyzed. The temperature corresponding to the most intense melting peak recorded during the second fusion is taken as the melting temperature. The fusion enthalpy $\Delta H_{fus}$ is measured using the most intense melting peak. If only one peak is detected, both the melting temperature and $\Delta H_{fus}$ are provided by the peak. To determine fusion enthalpy $\Delta H_{fus}$, a base-line is drawn by connecting the two closest points at which the melting endotherm peak deviate from the baseline. The heat of fusion ($\Delta H_{fus}$) is then calculated by integrating the area between the DSC heat flow recorded signal and the constructed baseline.

Xylene Soluble Fraction 2.5 g of polymer and 250 cm$^3$ of o-xylene are introduced in a glass flask equipped with a refrigerator and a magnetical stirrer. The temperature is raised over 30 minutes from room temperature up to the boiling point of the solvent (about 135° C.). The resulting clear solution is kept under reflux and stirred for 30 minutes. The closed flask is kept in a thermostatic water bath at 25° C. for 30 minutes so that the crystallization of the insoluble (XI) part of the sample takes place. The resulting solid is filtered on quick filtering paper. 100 cm$^3$ of the filtered liquid is poured in a previously weighed aluminum container, which is heated on a heating plate under nitrogen flow, to remove the solvent by evaporation. The container is then kept in an oven at 80° C. under vacuum until it is dry and then weighed after a constant weight is obtained.

The percent by weight of the polymer components that are soluble and insoluble in xylene at 25° C. may then be calculated.

Intrinsic Viscosity [$\eta$]

The sample is dissolved in tetrahydronaphthalene at 135° C. and then poured into a capillary viscometer. The viscometer tube (Ubbelohde type) is surrounded by a cylindrical glass jacket; this setup allows for temperature control with a circulating thermostated liquid. The downward passage of the meniscus is timed by a photoelectric device.

The passage of the meniscus in front of the upper lamp starts the counter, which has a quartz crystal oscillator. The meniscus stops the counter as it passes the lower lamp and the efflux time is registered. This value is converted into intrinsic viscosity using Huggins' equation (Huggins, M. L., *J. Am. Chem. Soc.*, 1942, 64, 2716) provided that the flow time of the pure solvent is known at the same experimental conditions (same viscometer and same temperature). One single polymer solution is used to determine [$\eta$].

Flexural Modulus*: ISO 178, measured 24 hours after molding.

Tensile strength at break*: ISO 527-2, measured 24 hours after molding.

Elongation at break*: ISO 527-2, measured 24 hours after molding.

Note: *Test specimens were prepared by compression molding according to ISO 1873-2: 1989.

Compression set: ISO 815-1:2008, Part 1.

Examples 1 and 2 (Reference Samples):
Preparation of the Precursor Ethylene Polymer Composition The solid catalyst component used in polymerization is a titanium-containing Ziegler-Nana catalyst component supported on magnesium chloride, prepared with the procedure described in EP Pat. Doc. 395083, Example 3, where diisobutyl phthalate is used as the internal donor compound.

Catalyst System and Prepolymerization Treatment

Before introducing it into the polymerization reactors, the solid catalyst component is contacted at 13° C. for 10 minutes with aluminum triethyl (TEAL) and dicyclopentyldimethoxysilane (DCPMS), in a TEAL/DCPMS weight ratio equal to about 13 (Example 1) or 15 (Example 2) and in such a quantity that the TEAL/solid catalyst component weight ratio is equal to 5 (Example 1) or 5.5 (Example 2).

The catalyst system is then subjected to prepolymerization by maintaining it in a liquid propylene suspension at 50° C. for about 65 minutes before introducing it into the first polymerization reactor.

Polymerization

The polymerization is carried out in continuous mode in a series of two gas-phase reactors equipped with devices to transfer the product from the first reactor to the second one.

An ethylene/propylene/butene-1 copolymer (component A)) is produced in the first gas phase polymerization reactor by feeding in a continuous and constant flow the prepolymerized catalyst system, hydrogen (used as molecular weight regulator), ethylene, propylene and butene-1 in a gaseous state.

The ethylene polymer coming from the first reactor is discharged in a continuous flow and, after having been purged of unreacted monomers, is introduced, in a continuous flow, into the second gas phase reactor, together with quantitative amounts of hydrogen, ethylene and propylene in a gaseous state.

In the second reactor, an ethylene/propylene copolymer (component B)) is produced. Polymerization conditions, molar ratios of the reactants and composition of the copolymers obtained are shown in Table I.

The polymer particles exiting the second reactor, which comprise the unstabilized precursor ethylene polymer composition according to the present disclosure, are subjected to a steam treatment to remove the reactive monomers and volatile substances, and then dried.

The polymer particles are mixed with a usual stabilizing additive composition in a twin screw extruder (Berstorff ZE 25: length/diameter ratio of screws: 33) and extruded under a nitrogen atmosphere using the following conditions:
Rotation speed: 250 rpm;
Extruder output: 15 kg/hour;
Melt temperature: 280-290° C.
The stabilizing additive composition is made of the following components:
  0.1% by weight of Irganox® 1010;
  0.1% by weight of Irgafos® 168;
  0.04% by weight of DHT-4A (hydrotalcite).
Irganox® 1010 comprises 2,2-bis[3-[5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos® 168 comprises tris(2,4-di-tert.-butylphenyl)phosphite.

The disclosed percentages refer to the total weight of the polymer and the stabilizing additive composition.

The features reported in Table II are obtained from measurements carried out on the extruded polymer, which constitutes the stabilized precursor ethylene polymer composition.

Examples 3-5

The stabilized precursor ethylene polymer compositions prepared as described above (hereinafter called "SPEP"), are reacted by extrusion under the previously described conditions with a peroxydicarbonate in the amounts reported in Table III, which refer to the to the total weight of the polymer and the peroxydicarbonate.

The peroxydicarbonate used is Perkadox 24, sold by AkzoNobel, which comprises dicetyl peroxydicarbonate.

The properties of the final composition are reported in Table III.

By comparison with the properties of the respective SPEPs of Examples 1 and 2 (Table II), an increase of strength at break and a decrease of compression set is observed. In Examples 4 and 5, the elongation at break is significantly increased.

Moreover, the ethylene polymer compositions beneficially remain thermoplastic, as shown by the Melt Flow Rate values.

The comonomer contents are the same for the final compositions as for the respective SPEPs. Also, the Tm and density values are not significantly different from those of the respective SPEPs.

TABLE I

| Example No. | | 1 | 2 |
|---|---|---|---|
| 1st Reactor (component A)) | | | |
| Temperature | ° C. | 75 | 75 |
| Pressure | barg | 20 | 20 |
| H2/C2- | mol. | 0.55 | 0.5 |

TABLE I-continued

| Example No. | | 1 | 2 |
|---|---|---|---|
| C3-/(C3- + C2-) | mol. | 0.022 | 0.023 |
| C4-/(C4- + C2-) | mol. | 0.058 | 0.05 |
| Split | wt % | 64 | 36 |
| Xylene soluble (XS$_A$) | wt % | 5.5 | — |
| MFR of A) | g/10 min. | 7.5 | 7.0 |
| Density of A) | g/cm$^3$ | 0.930 | 0.931 |
| C4- content of A) | wt % | 3.5 | 4.6 |
| C3- content of A) | wt % | 3.4 | 3.7 |
| 2nd Reactor (component B)) | | | |
| Temperature | ° C. | 65 | 65 |
| Pressure | barg | 20 | 20 |
| H2/C2- | mol. | 0.19 | 0.14 |
| C2-/(C2- + C3-) | mol. | 0.42 | 0.46 |
| Split | wt % | 36 | 64 |
| C2- content of B) | wt % | 65 | 65 |
| Xylene soluble of B) (XS$_B$) | wt % | 70 | 70 |
| Intrinsic Viscosity of XS$_B$ | dl/g | 2.6 | 3.1 |

Notes:
C3- = propylene; C2- = ethylene; C4- = butene-1; split = amount of polymer produced in the concerned reactor.

TABLE II

| Example No. | | 1 | 2 |
|---|---|---|---|
| eta (0.01) | Pa · s | 10306 | 30650 |
| eta (100) | Pa · s | 1513 | 2109 |
| ΔH$_{fus}$ | J/g | 87.4 | 67.3 |
| Tm | ° C. | 123.7 | 123.5 |
| MFR | g/10 min. | 2.1 | 0.85 |
| Xylene soluble (XS$_{TOT}$) | wt % | 34.6 | 47.7 |
| Intrinsic Viscosity of XS$_{TOT}$ | dl/g | 2.6 | 2.9 |
| Total C4- content* | wt % | 2.2 | 1.7 |
| Total C3- content | wt % | 14.8 | 23.7 |
| Flexural Modulus | MPa | 205 | 100 |
| Tensile Strength at break | MPa | 7.4 | 5.2 |
| Elongation at break | % | 760 | 509 |
| Compression set at 23° C. | % | 56 | 54 |
| Compression set at 70° C. | % | 67 | 66 |

Notes:
C3- = propylene;
C4- = butene-1 (estimated*)

TABLE III

| Example No. | | 3 | 4 | 5 |
|---|---|---|---|---|
| SPEP of Example | | 1 | 2 | 2 |
| Peroxydicarbonate amount | wt % | 0.4 | 0.3 | 0.5 |
| eta (0.01) | Pa · s | 42060 | 82650 | 108300 |
| eta (100) | Pa · s | 1619 | 2146 | 2179 |
| MFR | g/10 min. | 0.71 | 0.29 | 0.22 |
| Flexural Modulus | MPa | 178 | 92 | 99 |
| Tensile Strength at break | MPa | 8.2 | 6.9 | 7.9 |
| Elongation at break | % | 722 | 748 | 780 |
| Compression set at 23° C. | % | 50 | 50 | 48 |
| Compression set at 70° C. | % | 60 | 64 | 57 |

What is claimed is:
1. An ethylene polymer composition comprising an eta (0.01) value equal to or greater than 35,000 Pas and comprising:
   A) 25-75% by weight of an ethylene polymer selected from ($A_1$) ethylene homopolymers and ($A_2$) copolymers of ethylene with one or more olefin comonomers, wherein the comonomer content is 10% by weight or less with respect to the weight of the copolymer, and mixtures of homopolymers ($A_1$) and copolymers ($A_2$);

B) 25-75% by weight of a copolymer of ethylene and propylene comprising 45%-70%, by weight of ethylene;

wherein eta (0.01) is the complex shear viscosity at an angular frequency of 0.01 rad/s as measured via dynamic oscillatory shear in a plate-plate rotational rheometer at a temperature of 200° C., and A) and B) refer to the total weight of A)+B).

2. The ethylene polymer composition of claim 1, wherein the copolymers ($A_2$) are copolymers of ethylene with one or more comonomers selected from olefins having the formula $CH_2$=CHR, wherein R has 1-10 carbon atoms and is selected from the group consisting of an alkyl radical, a linear alkyl group and a branched alkyl group.

3. The ethylene polymer composition of claim 1, wherein the ethylene polymer A) has a density of 0.920-0.960 g/cm$^3$ as determined according to ISO 1183 at 23° C.

4. The ethylene polymer composition of claim 1, showing a melting peak at a temperature Tm of 120° C. or higher as measured by differential scanning calorimetry with a heating rate of 20° C. per minute.

5. The ethylene polymer composition of claim 1, having an MFR value of 0.1-3 g/10 min as determined according to ISO 1133 at 230° C. with a load of 2.16 kg.

6. The ethylene polymer composition of claim 1, wherein the composition is produced by reacting:
I) a precursor ethylene polymer composition having an eta (0.01) of lower than 35,000 Pa s and comprising:
A) 25-75% by weight of an ethylene polymer selected from ($A_1$) ethylene homopolymers and ($A_2$) copolymers of ethylene with one or more olefin comonomers, wherein the comonomer content is 10% by weight or less with respect to the weight of the copolymer, and mixtures of homopolymers ($A_1$) and copolymers ($A_2$);
B) 25-75% by weight of a copolymer of ethylene and propylene containing from 45% to 70% by weight of ethylene;
wherein A) and B) refer to the total weight of A)+B); and
II) a radical initiator.

7. The ethylene polymer composition of claim 6, wherein the radical initiator comprises a peroxydicarbonate.

8. A process for preparing the ethylene polymer composition of claim 1, comprising:
i) preparing a precursor ethylene polymer composition having an eta (0.01) of lower than 35,000 Pa s and comprising:
A) 25-75% by weight of an ethylene polymer selected from ($A_1$) ethylene homopolymers and ($A_2$) copolymers of ethylene with one or more olefin comonomers, wherein the comonomer content is 10% or less with respect to the weight of the copolymer, and mixtures of homopolymers ($A_1$) and copolymers ($A_2$);
B) 25-75% by weight of a copolymer of ethylene and propylene containing from 45-70% by weight of ethylene;
where A) and B) refer to the total weight of A)+B),
C) polymerizing the monomers in at least two sequential steps, wherein components A) and B) are prepared in sequential steps, operating in the presence of the polymer formed and the catalyst used in the preceding step; and
ii) reacting the precursor composition obtained in i) with a radical initiator.

9. A formed article comprising the polyolefin composition of claim 1.

10. The formed article of claim 9, comprising an extruded article.

* * * * *